United States Patent
Han et al.

(10) Patent No.: US 10,877,595 B2
(45) Date of Patent: Dec. 29, 2020

(54) FINGERPRINT SENSOR INTEGRATED TYPE TOUCH SCREEN PANEL

(71) Applicant: LG Display Co., Ltd., Seoul (KR)

(72) Inventors: Manhyeop Han, Seoul (KR); Guensik Lee, Seoul (KR); Kyoseop Choo, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 129 days.

(21) Appl. No.: 15/790,959

(22) Filed: Oct. 23, 2017

(65) Prior Publication Data

US 2018/0113346 A1 Apr. 26, 2018

(30) Foreign Application Priority Data

Oct. 24, 2016 (KR) .................. 10-2016-0138420

(51) Int. Cl.
   *G02F 1/1333* (2006.01)
   *G02F 1/1343* (2006.01)
   (Continued)

(52) U.S. Cl.
   CPC ........ *G06F 3/04164* (2019.05); *G02F 1/1343* (2013.01); *G02F 1/13338* (2013.01);
   (Continued)

(58) Field of Classification Search
   None
   See application file for complete search history.

(56) References Cited

U.S. PATENT DOCUMENTS 8,564,314 B2  10/2013  Shaikh et al.
2013/0135247 A1*  5/2013  Na .................... G06F 21/32
                                            345/174

(Continued)

FOREIGN PATENT DOCUMENTS

CN   103793099 A   5/2014
CN   104978559 A   10/2015
(Continued)

OTHER PUBLICATIONS

Chinese Office Action dated Oct. 9, 2020 issued in corresponding Patent Application No. 201711000094.2 (22 pages).

*Primary Examiner* — Matthew Yeung
(74) *Attorney, Agent, or Firm* — Polsinelli PC

(57) ABSTRACT

The present disclosure relates to a fingerprint sensor integrated type touch screen panel having at least one fingerprint/touch area and a plurality of touch areas. The touch screen panel includes a fingerprint/touch driving electrode group including a plurality of fingerprint/touch driving electrodes; a fingerprint/touch sensing electrode group including a plurality of fingerprint/touch sensing electrodes; a touch driving electrode group including a plurality of touch driving electrodes; a touch sensing electrode group including a plurality of touch sensing electrodes; and a touch IC configured to supply touch driving signals to the touch driving electrode group and the fingerprint/touch driving electrode group and obtain touch sensing data by sensing the touch sensing electrode group and some of the fingerprint/touch sensing electrodes in a touch sensing mode, and supply fingerprint driving signals to the fingerprint/touch driving electrodes and obtain fingerprint sensing data by sensing the fingerprint/touch sensing electrodes in a fingerprint sensing mode.

20 Claims, 9 Drawing Sheets

(51) Int. Cl.
  *G06F 3/041* (2006.01)
  *G06F 3/044* (2006.01)
  *G06K 9/00* (2006.01)

(52) U.S. Cl.
  CPC ...... *G06F 3/0446* (2019.05); *G06F 3/041661* (2019.05); *G06K 9/001* (2013.01); *G06K 9/0002* (2013.01)

(56) References Cited

U.S. PATENT DOCUMENTS

| | | | |
|---|---|---|---|
| 2013/0307818 A1 | 11/2013 | Pope et al. | |
| 2014/0118301 A1* | 5/2014 | Cho | G06F 3/0416 345/174 |
| 2014/0333328 A1* | 11/2014 | Nelson | G06F 3/044 324/663 |
| 2016/0364593 A1* | 12/2016 | Lee | G06F 3/0416 |
| 2017/0024597 A1* | 1/2017 | Cho | G06F 21/32 |
| 2017/0364178 A1 | 12/2017 | Nelson et al. | |

FOREIGN PATENT DOCUMENTS

| | | |
|---|---|---|
| KR | 10-1432988 B1 | 8/2014 |
| KR | 10-2015-0087811 A | 7/2015 |

\* cited by examiner

FINGERPRINT SENSOR INTEGRATED TYPE TOUCH SCREEN PANEL

CROSS-REFERENCE TO RELATED APPLICATION

This application claims the priority benefit of Korean Patent Application No. 10-2016-0138420 filed on Oct. 24, 2016, the entire contents of which is incorporated herein by reference for all purposes as if fully set forth herein.

BACKGROUND

Field of the Disclosure

The present disclosure relates to a display device, and more particularly, to a fingerprint integrated type touch screen panel.

Discussion of the Related Art

With the development of computer technology, computer based systems, which can be applied to various utilities such as notebook computers, tablet personal computers (PCs), smart phones, personal digital assistants (PDAs), automated teller machines (ATMs), and information systems, have been developed. In general, computer based systems store various data including private information such as confidential business information and personal information related to the privacy. Thus, strong security mechanisms are typically desired to protect such information.

To this end, fingerprint sensors have been developed to strengthen security by performing registration or certification of systems using fingerprints of human beings.

The fingerprint sensor is a sensor capable of sensing fingerprints of human beings. A fingerprint sensor can be classified into an optical fingerprint sensor and a capacitive fingerprint sensor.

The optical fingerprint sensor is based on the principle that a light source, such as a light emitting diode (LED), emits light and the light reflected from ridges and valleys of a fingerprint is sensed through a CMOS image sensor. However, problems in this field are an increase in size due to the use of LEDs and a rise in the product cost due to the use of expensive light source.

The capacitive fingerprint sensor utilizes a difference of electric charges charged between ridges and valleys of the fingerprint contacted thereto.

U.S. Patent Publication No. 2013/0307818 published on Nov. 21, 2013 and entitled "Capacitive Sensor Packaging" describes a capacitive fingerprint sensor of a related art.

The published capacitive fingerprint sensor has an assembly form coupled with a particular push button. The capacitive fingerprint sensor includes a silicon wafer, on which a circuit for measuring a capacitance between a fingerprint (ridges and valleys) and a capacitive plate is printed.

In general, the capacitive fingerprint sensor described in US Patent Publication No. 2013/0307818 requires a high resolution sensor array and an integrated circuit (IC) for the fingerprint recognition processing because the fingerprint's ridges and valleys have a very minute size of about 300 µm to 500 µm. To this end, the capacitive fingerprint sensor utilizes the silicon wafer for integrating the IC with the sensor array.

However, when the IC and the high resolution sensor array are integrated using the silicon wafer, the small-sized packaged fingerprint sensor has to be embedded in a push button (e.g., a home key of a smart phone) or separately attached to a back surface of the push button because the silicon wafer is opaque and has a limit to an increase in size. Thus, an assembly configuration for coupling the fingerprint sensor with the push button is necessary, thereby leading to an increase in size (due to a non-display area and a thickness) and a rise in the product cost.

To address the above-described problems, a technology has been developed to use an area of a touch sensor screen as a fingerprint identification area. The technology is described in U.S. Pat. No. 8,564,314 issued on Oct. 22, 2013 and entitled "Capacitive touch sensor for identifying a fingerprint" and Korean Patent No. 10-1432988 issued on Aug. 18, 2014 and entitled "Fingerprint recognition integrated type capacitive touch screen".

FIG. 1 is a plan view schematically illustrating an arrangement of driving electrodes and sensing electrodes of a capacitive sensing panel shown in FIG. 5 of U.S. Pat. No. 8,564,314. FIG. 2 is a plan view illustrating configuration of a fingerprint recognition integrated type capacitive touch screen shown in FIG. 3 of Korean Patent No. 10-1432988.

Referring to FIG. 1, a capacitive touch sensor for identifying a fingerprint includes a touch sensor 403 including touch driving electrodes 401(x) and touch sensing electrodes 401(y) and a fingerprint sensor 405 including fingerprint driving electrodes 405(x) and fingerprint sensing electrodes 405(y). In the capacitive touch sensor for identifying the fingerprint, because the fingerprint sensor 405 is separately disposed in a portion of a screen area, problems posed include a non-touch of the fingerprint sensor 405 or a reduction in a touch performance around the fingerprint sensor 405.

Referring to FIG. 2, a fingerprint recognition integrated type capacitive touch screen includes a touch panel 110, electrode connection lines 120, and a touch controller 130. The touch panel 110 includes fine channels 113 formed by a combination of first channel electrodes 111 (one of Tx and Rx) and second channel electrodes 112 (the other of Tx and Rx) crossing each other. The fine channels 113 are configured such that the fine channels 113 of a remaining area except an area of fingerprint recognition sensors 114 form a plurality of groups each serving as a touch group channel 115 for sensing a touch signal, and the fine channels 113 corresponding to the area of the fingerprint recognition sensors 114 each serve as a fingerprint recognition channel 116.

However, this fingerprint recognition integrated type capacitive touch screen may greatly increase a mutual capacitance between touch channels because of the fine channels 113 (i.e., the touch channels) serving as the touch group channels 115. Because an increase in the mutual capacitance reduces sensitivity of the touch sensor, a touch operation may not be recognized when the touch operation is generated.

SUMMARY

Accordingly, the disclosure is to provide a fingerprint sensor integrated type touch screen panel for eliminating a dead zone in the active area of the touch screen panel and reducing deterioration of touch performance due to increase of mutual capacitance generated by forming touch electrodes as fine patterns.

To achieve these and other advantages and in accordance with the purpose of the present disclosure, as embodied and broadly described, a fingerprint sensor integrated type touch screen panel having at least one fingerprint/touch area and a plurality of touch areas, the touch screen panel comprising: a fingerprint/touch driving electrode group including a plurality of fingerprint/touch driving electrodes in parallel with to each other in a first direction to pass through the at least one fingerprint/touch area; a fingerprint/touch sensing electrode group including a plurality of fingerprint/touch sensing electrodes in parallel with to each other in a second direction crossing the first direction to pass through the at least one fingerprint/touch area; a touch driving electrode group including a plurality of touch driving electrodes in parallel with to each other in the first direction to pass through touch areas disposed in the first direction; a touch sensing electrode group including a plurality of touch sensing electrodes in parallel with to each other in the second direction to pass through touch areas disposed in the second direction; and a touch IC configured to supply touch driving signals to the touch driving electrode group and the fingerprint/touch driving electrode group and obtain touch sensing data by sensing the touch sensing electrode group and some of the plurality of fingerprint/touch sensing electrodes in a touch sensing mode, and supply fingerprint driving signals to the fingerprint/touch driving electrodes and obtain fingerprint sensing data by sensing the plurality of fingerprint/touch sensing electrodes in a fingerprint sensing mode.

In another aspect of the present disclosure, a fingerprint sensor integrated type touch screen panel having at least one fingerprint/touch area and a plurality of touch areas having at least first to fourth sections, the touch screen panel includes a plurality of fingerprint/touch sensing electrodes and a plurality of fingerprint/touch driving electrodes disposed in the at least one fingerprint/touch area; a first group of touch driving electrodes, each first group touch driving electrode in parallel with each other along a first direction and disposed in the first and second sections; a second group of touch driving electrodes, each second group touch driving electrode in parallel with each other in the first direction and disposed in the third and fourth sections; a first group of touch sensing electrodes, each first group touch sensing electrode in parallel with each other along a second direction and disposed in the first and third sections; a second group of touch sensing electrodes, each second group touch sensing electrode in parallel with each other along the second direction and disposed in the second and fourth sections; a driving signal supply unit connected to the first and second groups of touch driving electrodes respectively through first and second touch driving routing wires; and a touch sensing unit connected to the first and second groups of touch sensing electrodes respectively through first and second touch sensing routing wires, wherein the first and second groups of touch sensing electrodes and a part of the plurality of fingerprint/touch sensing electrodes are used for a touch sensing function in a touch sensing mode.

In a further aspect of the disclosure, a fingerprint sensor integrated type touch screen panel having at least first and second fingerprint/touch areas and a plurality of touch areas, the touch screen panel includes a plurality of touch driving electrodes and a plurality of touch sensing electrodes disposed in the a plurality of touch areas; a plurality of fingerprint/touch driving electrodes arranged along a first direction and disposed in the first and second fingerprint/touch areas; a first fingerprint/touch sensing electrode group including a plurality of first fingerprint/touch sensing electrodes arranged along a second direction in the first fingerprint/touch area; a second fingerprint/touch sensing electrode group including a plurality of second fingerprint/touch sensing electrodes arranged along the second direction in the second fingerprint/touch area; a driving signal supply unit connected to the plurality of fingerprint/touch driving electrodes through a plurality of touch driving routing wires; and a touch sensing unit connected to the first and second fingerprint/touch sensing electrode groups through a plurality of touch sensing routing wires, wherein the plurality of touch sensing electrodes and a part of the first and second fingerprint/touch sensing electrode groups are used for a touch sensing function in a touch sensing mode.

The some of the plurality of fingerprint/touch sensing electrodes are disposed at center portion of the fingerprint/touch area.

The some of the plurality of fingerprint/touch sensing electrodes are 5% to 50% of a total number of the fingerprint/touch sensing electrodes disposed in the fingerprint/touch area.

The touch IC comprises a driving signal supply unit configured to supply the touch driving signals of which phases are sequentially delayed to the touch driving electrode group and the fingerprint/touch driving electrode group in the touch sensing mode, and supply the fingerprint driving signals of which phases are sequentially delayed to the fingerprint/touch driving electrodes in the fingerprint sensing mode; a touch sensing unit configured to obtain the touch sensing data of the plurality of touch areas and the at least one fingerprint/touch area by sensing the touch sensing electrode group and the some of the plurality of fingerprint/touch sensing electrodes in the touch sensing mode; and a fingerprint sensing unit obtain the fingerprint sensing data of the at least one fingerprint/touch area by sensing the plurality of fingerprint/touch sensing electrodes in the fingerprint sensing mode.

The touch sensing unit comprises a first touch integration block configured to sense the touch sensing electrode group via touch sensing routing wires and integrate analog touch sensing data sensed through the touch sensing routing wires; and a first touch analog/digital converter configured to convert the analog touch sensing data output from the first touch integration block into digital touch sensing data. The fingerprint sensing unit comprises a fingerprint integration block configured to sense the plurality of fingerprint/touch sensing electrodes via fingerprint sensing routing wires and integrate analog fingerprint sensing data sensed through the fingerprint sensing routing wires; and a fingerprint analog/digital converter configured to convert the analog fingerprint sensing data output from the fingerprint integration block into digital fingerprint sensing data.

The touch sensing unit further comprises a second touch integration block configured to sense the some of the plurality of fingerprint/touch sensing electrodes via the fingerprint sensing routing wires and integrate analog sensing data sensed through the fingerprint sensing routing wires; and a second touch analog/digital converter configured to convert the analog sensing data output from the second touch integration block into digital sensing data.

According to the disclosure, it is possible to obtain a touch screen panel having a narrow bezel area since the touch screen panel does not require a separate fingerprint sensor area in the bezel area.

In addition, since the fingerprint/touch electrodes are disposed in the fingerprint/touch area of the active area, it is possible to implement fingerprint recognition function as well as touch recognition function, thereby preventing a dead zone from being formed in the active area of the touch screen panel.

In addition, since the touch electrode is formed in a large pattern and the fingerprint/touch electrode is formed in a fine pattern, it is possible to prevent deterioration of touch performance generated when the touch electrode is formed in a fine pattern.

Furthermore, since only some of the fingerprint/touch sensing electrodes disposed in the fingerprint/touch area can be used as the touch sensing electrode in the touch sensing mode, it is possible to simultaneously perform touch sensing and fingerprint sensing while reducing the number of channels.

BRIEF DESCRIPTION OF THE DRAWINGS

The accompanying drawings, which are included to provide a further understanding of the present disclosure and are incorporated in and constitute a part of this application, illustrate aspects of the disclosure and together with the description serve to explain the principles of the disclosure.

In the drawings.

DETAILED DESCRIPTION

Reference will now be made in detail to aspects of the present disclosure, examples of which are illustrated in the accompanying drawings. Wherever possible, the same reference numbers will be used throughout the drawings to refer to the same or like parts. Detailed description of known arts will be omitted if it is determined that the arts can mislead the aspects of the present disclosure. Names of the respective elements used in the following explanations are selected only for convenience of writing the specification and may be thus different from those used in actual products.

In the following description, a terminology "a fingerprint/touch sensor" means that it acts as a touch sensor during a touch sensing period for sensing whether the touch screen is touched or not, and it acts a fingerprint sensor during a fingerprint sensing period for sensing a fingerprint. That is, the terminology "a fingerprint/touch sensor" may be simultaneously used as a touch sensor and a fingerprint sensor.

Also, a terminology "a touch area" means only an area where a touch is sensed. A terminology "a fingerprint/touch area" means an area where both a touch and a fingerprint are sensed. A terminology "active area" means an area including the touch area and the fingerprint/touch area. A terminology "a bezel area" means an area outside the active area of the touch screen panel.

Also, a terminology "a touch electrode" means an electrode including "a touch driving electrode" to which a touch driving voltage is applied to, and "a touch sensing electrode" from which a mutual capacitance generated between the touch driving electrode and the touch sensing electrode is sensed.

Also, a terminology "a fingerprint/touch electrode" means an electrode functioning as "a fingerprint/touch driving electrode" and "a fingerprint/touch sensing electrode". The fingerprint/touch driving electrode is provided with a touch driving voltage during a touch sensing period, and is provided with a fingerprint driving voltage during a fingerprint sensing period. The fingerprint/touch sensing electrode is sensed to obtain a touch mutual capacitance generated between the fingerprint/touch sensing electrode and the fingerprint/touch sensing electrode during the touch sensing period and, is sensed to obtain a fingerprint mutual capacitance generated between the fingerprint/touch sensing electrode and the fingerprint/touch sensing electrode during the fingerprint sensing period.

Hereinafter, a display device to which a fingerprint sensor integrated type touch screen panel according to an aspect of the present disclosure is applied will be described with reference to FIG. 4.

Figure 1:
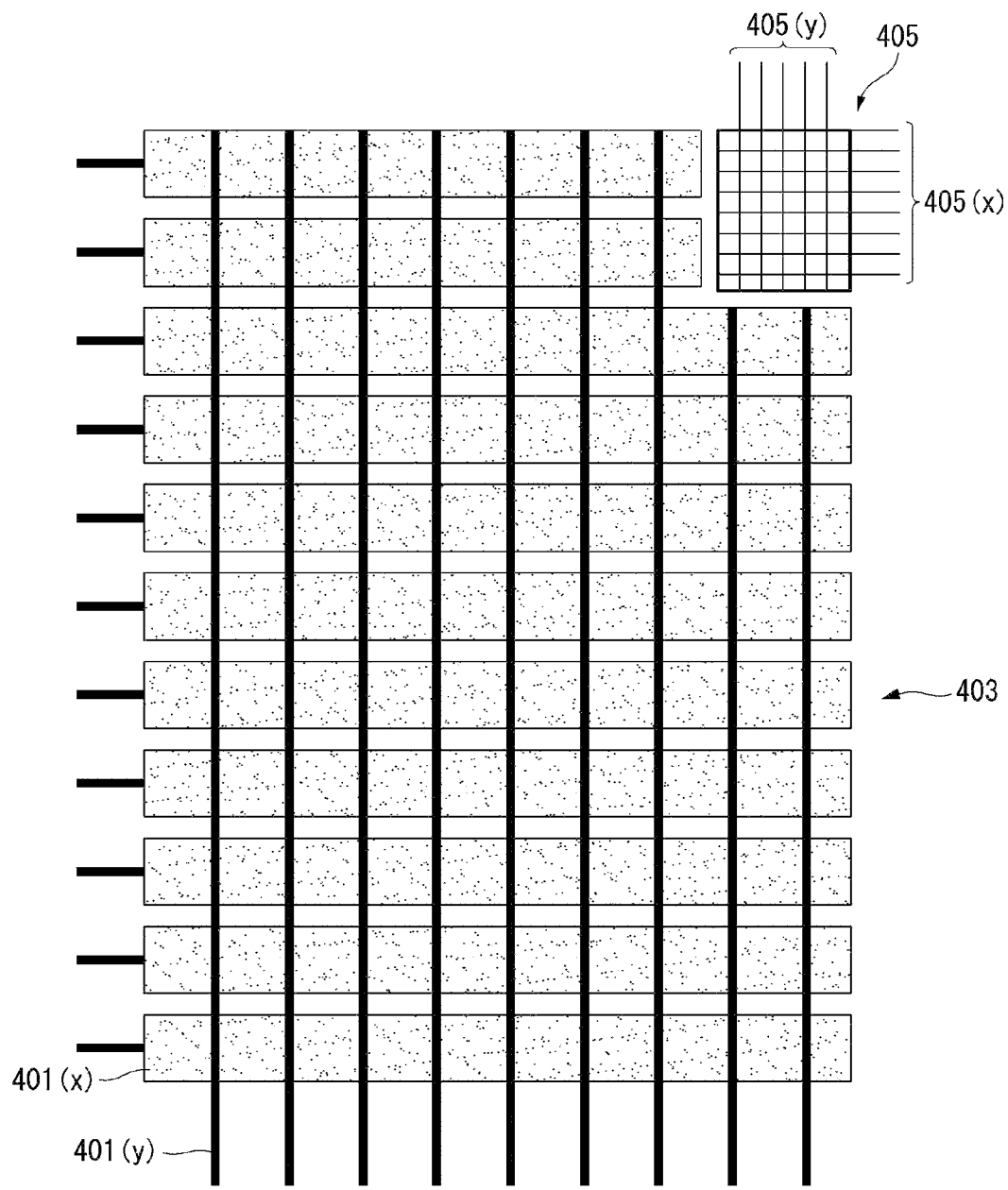
FIG. 1 is a plan view schematically illustrating an arrangement of driving electrodes and sensing electrodes of a capacitive sensing panel of the related art.
Figure 2:
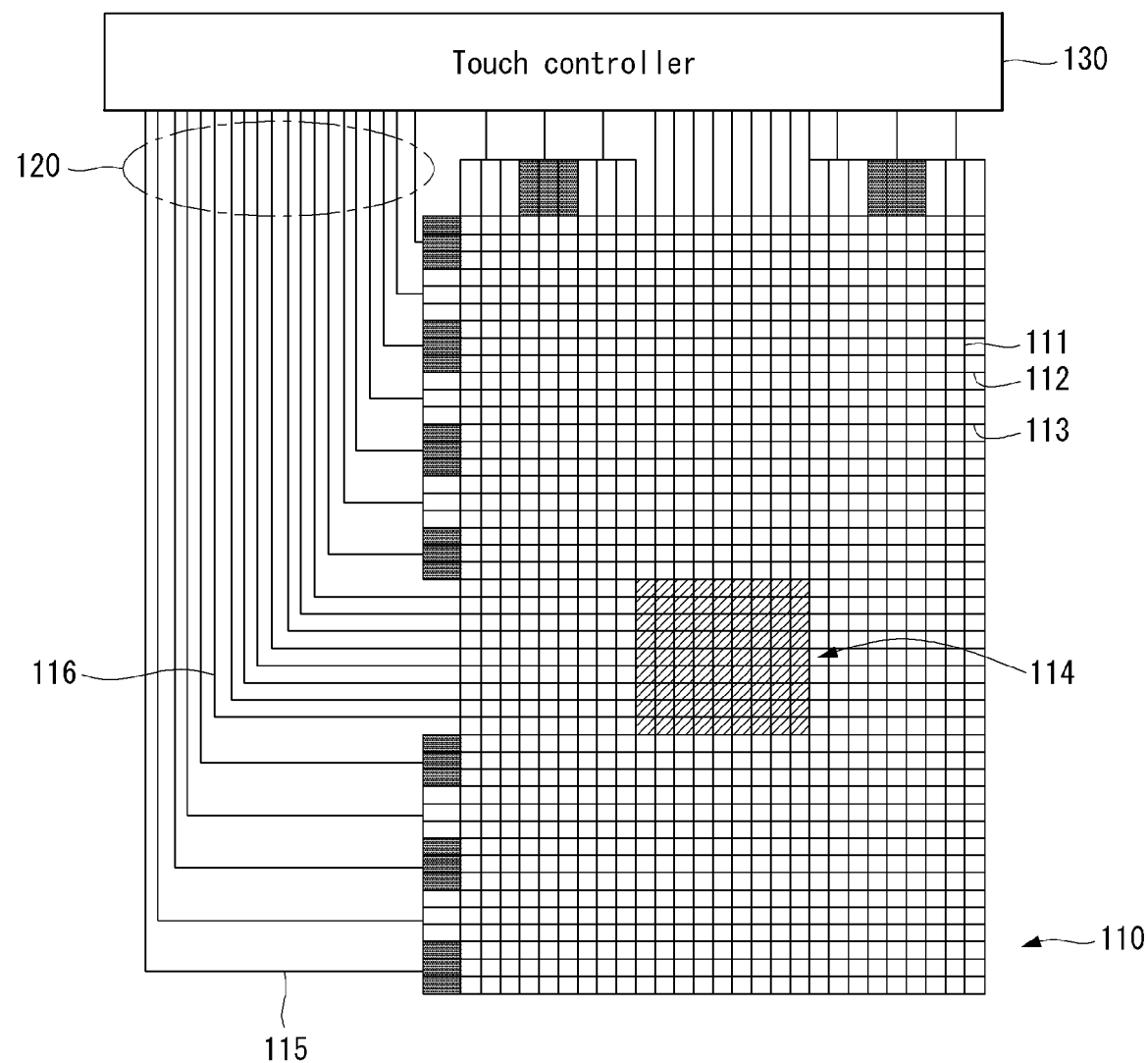
FIG. 2 is a plan view illustrating configuration of a fingerprint recognition integrated type capacitive touch screen of the related art.
Figure 3A:
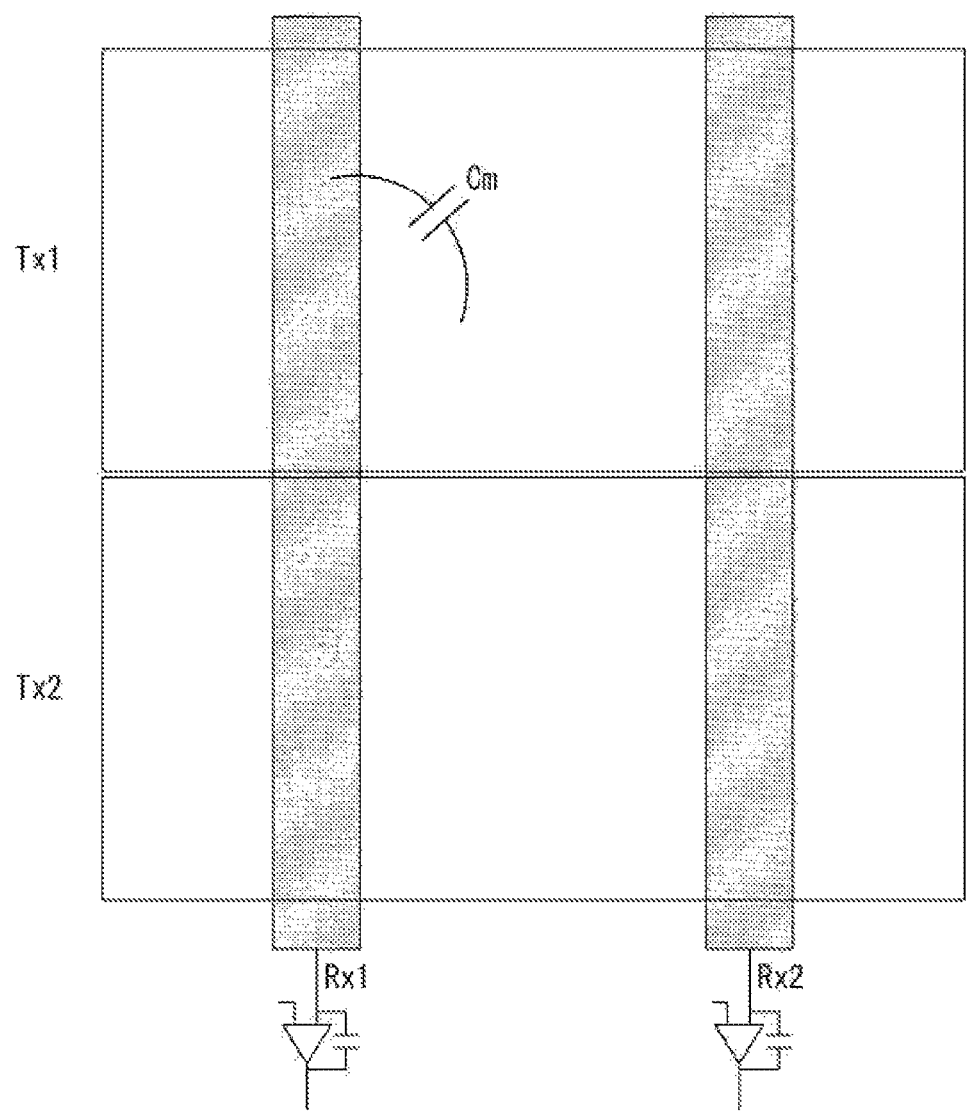
FIG. 3A is a diagram showing a mutual capacitance generated between general touch sensor patterns.
Figure 3B:
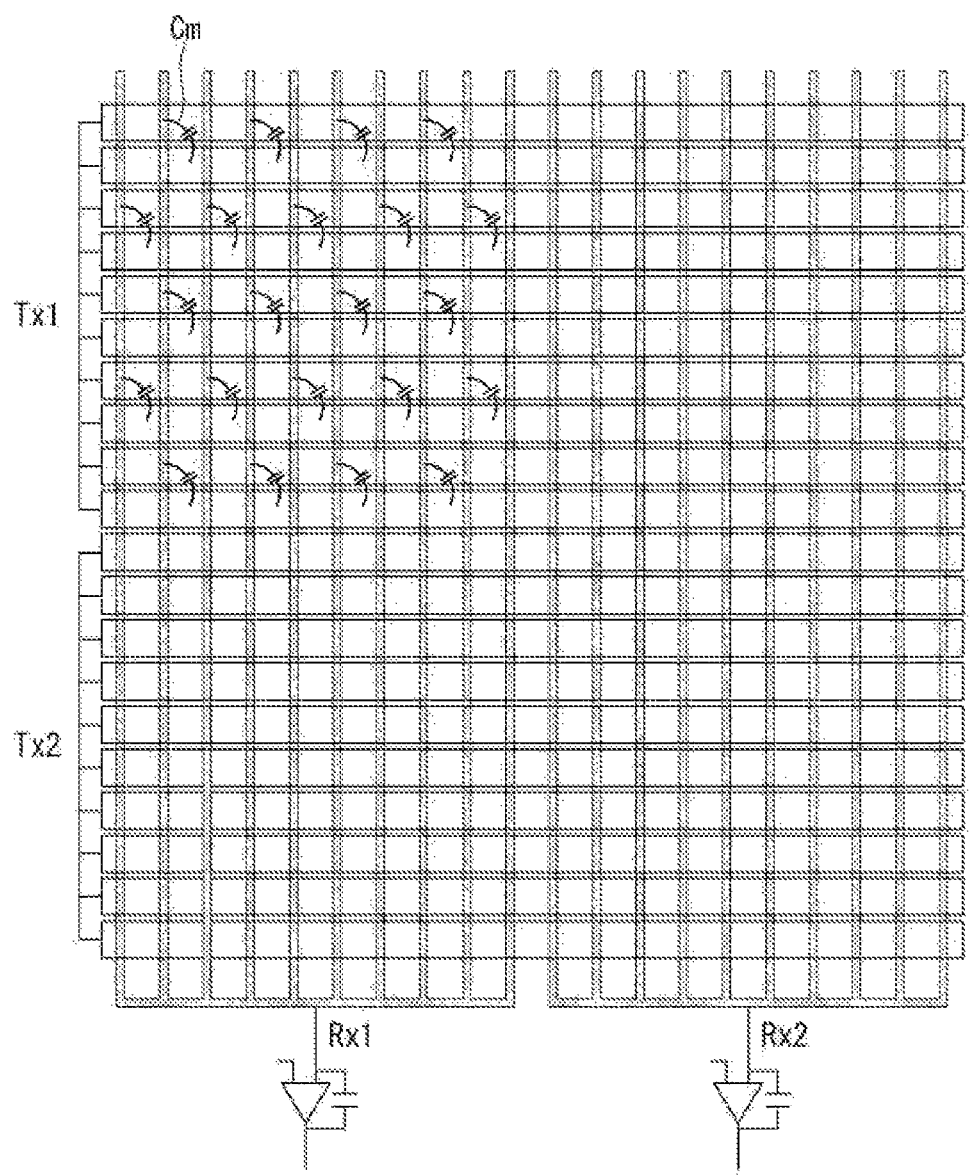
FIG. 3B is a diagram showing a mutual capacitance generated between high-density touch sensor patterns.
Figure 4:
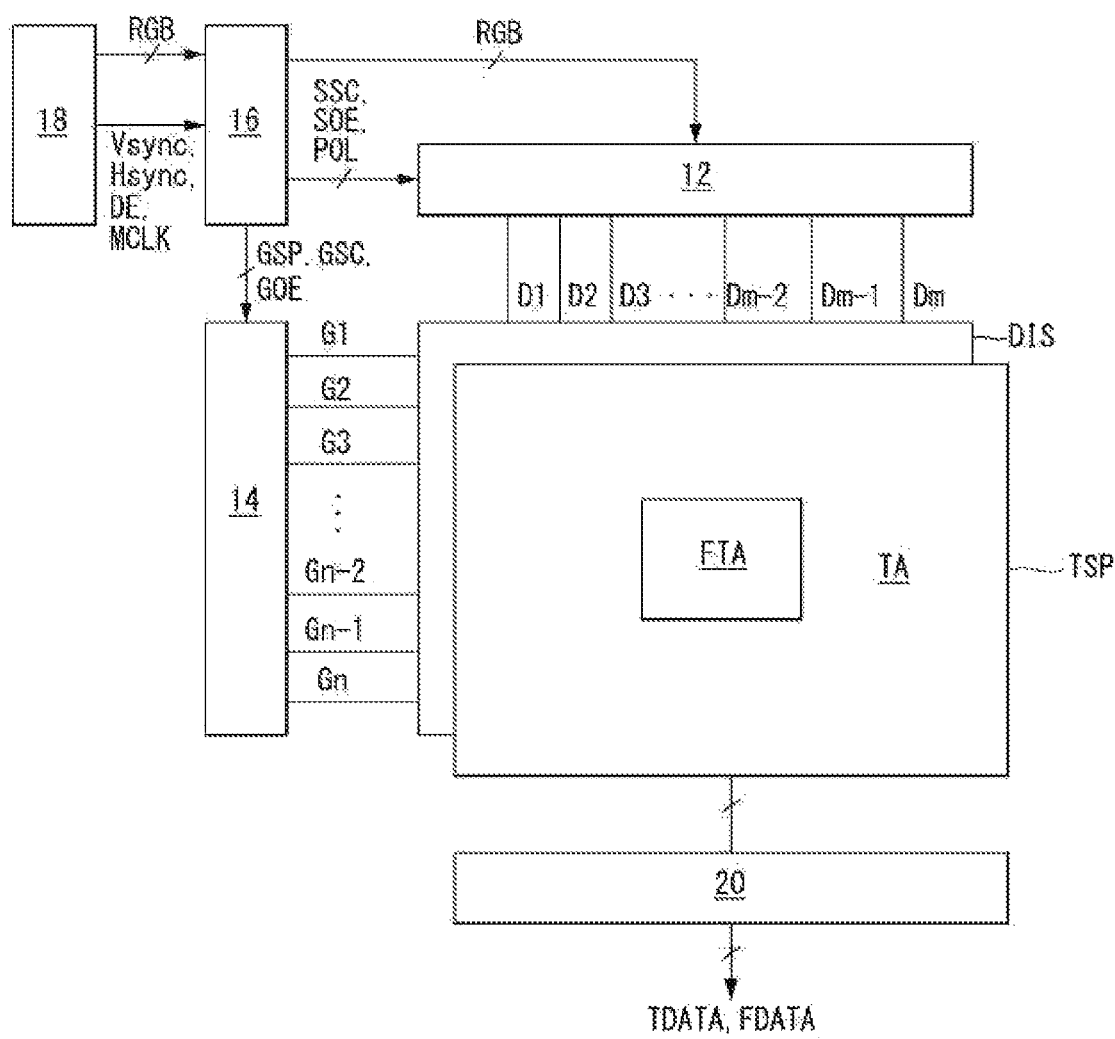
FIG. 4 is a block diagram illustrating a display device to which a fingerprint sensor integrated type touch screen panel according to an aspect of the present disclosure.

FIG. 4 is a block diagram illustrating a display device to which a fingerprint sensor integrated type touch screen panel according to an aspect of the present disclosure is applied.

Referring to FIG. 4, the display device to which a fingerprint sensor integrated type touch screen panel according to the present disclosure includes a touch screen panel TSP, a touch IC 20, a display panel DIS, a data driving circuit 12, a scan driving circuit 14, a timing controller 16 and a host system 18.

The touch screen panel TSP includes a touch area TA in which touch driving electrodes and touch sensing electrodes are disposed, and a fingerprint/touch area FTA in which fingerprint/touch driving electrodes and fingerprint/touch sensing electrodes are disposed.

The touch IC 20 may include a driving signal supply unit and a sensing unit. The driving signal supply unit applies driving voltages to the touch driving electrodes in the touch area, and the fingerprint/touch driving electrodes in the fingerprint/touch area. The sensing unit senses the touch sensing electrodes in the touch area, and the fingerprint/touch sensing electrodes in the fingerprint/touch area.

The touch IC 20 outputs touch sensing data TDATA and fingerprint sensing data FDATA obtained by sensing the touch sensing electrodes and the fingerprint/touch sensing electrodes.

The display panel DIS may be a liquid crystal display (LCD), a field emission display (FED), a plasma display panel (PDP), an organic light emitting diode display (OLED) panel, and an electrophoresis display panel (EPD). In the following description, the liquid crystal display panel will be described as an example of the flat panel display panel, but the display panel of the present disclosure is not limited to the liquid crystal display panel.

The display panel DIS includes a liquid crystal layer disposed between two substrates. The pixel array of the display panel DIS includes pixels defined by data lines D1 to Dm (herein, m is a positive integer) and gate lines G1 to Gn (herein, n is a positive integer). Each of the pixels may include a plurality of thin film transistors TFTs formed at crossings of the data lines D1 to Dm and the gate lines G1 to Gn, pixel electrodes for charging a data voltage in liquid crystal cells, storage capacitors Cst connected to the pixel electrodes to maintain voltages of the liquid crystal cells, and so on.

On an upper substrate of the display panel DIS, a black matrix, color filters and so on may be disposed. A lower substrate of the display panel DIS may be realized in a color filter on TFT (COT) structure. In this case, the black matrix and the color filters may be formed on the lower substrate of the display panel DIS. On the upper substrate or the lower substrate of the display panel DIS, a common electrode for supplying a common voltage is disposed. Polarizers are respectively attached to the upper substrate and the lower substrate of the display panel DIS and alignment films for setting a liquid crystal pre-tilt angle are respectively formed on the inner sides of the upper and lower substrates coming into contact with liquid crystal. Column spacers for maintaining a cell gap of the liquid crystal cells may be formed between the upper substrate and the lower substrate of the display panel DIS.

A backlight unit may be disposed below a rear surface of the display panel DIS. The backlight unit may be implemented as an edge type or direct type backlight unit, and irradiates the display panel DIS with light. The display panel DIS may be implemented as a TN (Twisted Nematic) mode, a VA (Vertical Alignment) mode, an IPS (In Plane Switching) mode or a FFS (Fringe Field Switching) mode.

The display driving circuit including a data driving circuit 12, a scan driving circuit 14 and a timing controller 16 writes video data voltages of an input image to pixels of the display panel DIS. The data driving circuit 12 converts digital video data RGB input from the timing controller 16 into analog gamma compensation voltages to generate data voltages. The data voltages output from the data driving circuit 12 are supplied to the data lines D1 to Dm. The scan driving circuit 14 sequentially supplies gate pulses synchronized with the data voltages to the gate lines G1 to Gn to select the pixels of the display panel DIS to which the data voltages are written.

The timing controller 16 controls operation timings of the data driving circuit 12 and the gate driving circuit 14 using timing signals such as a vertical synchronization signal Vsync, a horizontal synchronization signal Hsync, a data enable signal DE, and a main clock signal MCLK, which are received from a host system 18. The scan timing control signal for controlling the gate driving circuit 14 includes a gate start pulse GSP, a gate shift clock GSC, a gate output enable signal GOE and so on. The data timing control signal for controlling the data driving circuit 12 includes a source sampling clock SSC, a source output enable signal SOE and so on.

The host system 18 may be implemented by one of a television system, a set-top box, a navigation system, a DVD player, a blue-ray player, a personal computer (PC), a home theater system, a phone system and so on. The host system 18 includes a system on chip (SoC) with a built-in scaler to convert the digital video data RGB of the input image into a format suitable for display on the display panel DIS. The host system 18 transmits the timing signals Vsync, Hsync, DE, and MCLK to the timing controller 16 together with the digital video data. The host system 18 also executes an application program associated with the touch sensing data TDATA and the fingerprint sensing data FDATA input from the touch IC 20.

Next, a fingerprint sensor integrated touch screen panel according to an aspect of the present disclosure will be described with reference to FIGS. 5 to 7.

Figure 5:
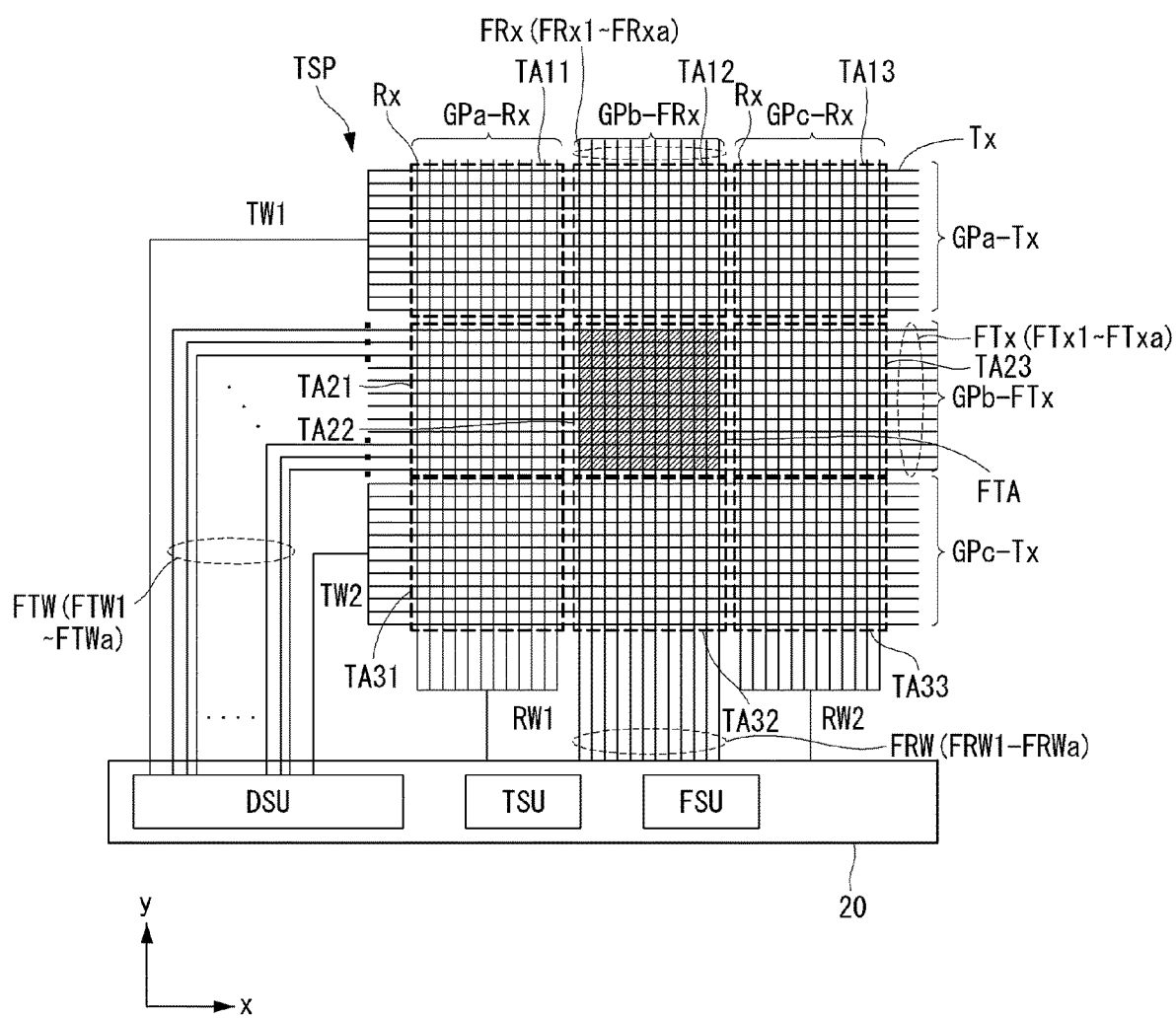
FIG. 5 is a plan view illustrating the fingerprint sensor integrated type touch screen panel shown in FIG. 4.

FIG. 5 is a plan view illustrating the fingerprint sensor integrated type touch screen panel shown in FIG. 4. FIG. 6 are waveform diagrams illustrating sensor driving signals (i.e., touch sensor driving signals) applied to the fingerprint sensor integrated type touch screen panel in a touch sensing mode. FIG. 7 are waveform diagrams illustrating sensor driving signals (i.e., fingerprint sensor driving signals) applied to the fingerprint sensor integrated type touch screen panel in a fingerprint sensing mode.

Referring to FIG. 5, the touch screen panel TSP includes at least one fingerprint/touch area FTA and a plurality of touch areas TA. In FIG. 5, the fingerprint/touch area FTA is illustrated as being located at the center of the touch screen panel TSP. However, the position is not specified, it should be understood that the fingerprint/touch area FTA may be disposed in any area of the touch screen panel, such as a corner portion, or one side portion of the touch screen panel.

There are touch driving electrode groups GPa-Tx and GPc-Tx and touch sensing electrode groups GPa-Rx, GPc-Rx in the touch areas TA11, TA12, TA13, TA21, TA22, TA23, TA31, TA32 and TA33 of the touch screen panel TSP. Each of the touch driving electrode groups GPa-Tx and GPc-Tx includes a plurality of touch driving electrodes Tx arranged in parallel with each other in a first direction (e.g., y-axis direction). Each of the touch sensing electrode groups GPa-Rx, GPc-Rx includes a plurality of first touch sensing electrodes Rx arranged in parallel with each other in a second direction (e.g., x-axis direction) crossing the first direction.

There are fingerprint/touch driving electrode group GPb-FTx and fingerprint/touch sensing electrode group GPb-FRx in the fingerprint/touch area FTA of the touch screen panel TSP. The fingerprint/touch driving electrode group GPb-FTx includes a plurality of fingerprint/touch driving electrodes FTx arranged in parallel with each other in the first direction. The fingerprint/touch sensing electrode group GPb-FRx includes a plurality of fingerprint/touch sensing electrodes FRx arranged in parallel with each other in the second direction. The fingerprint/touch driving electrode group GPb-FTx may be extended to the touch areas TA21 and TA23 neighbored thereto, and the fingerprint/touch sensing electrode group GPb-FRx may be extended to the touch areas TA12 and TA32 neighbored thereto.

The touch driving electrode groups GPa-Tx and GPc-Tx are connected to the touch IC 20 through touch routing wires TW1 and TW2, respectively. The plurality of fingerprint/touch driving electrodes FTx constituting the fingerprint/touch driving electrode group GPb-FTx are connected to a driving signal supply unit DSU of the touch IC 20 via a plurality of fingerprint/touch driving routing wires FTW.

The touch sensing electrode groups GPa-Rx, GPc-Rx are connected to a touch sensing unit TSU of the touch IC 20 via touch sensing routing wires RW1 and RW2, respectively. The plurality of fingerprint/touch sensing electrodes FRx are connected to a fingerprint sensing unit FSU of the touch IC 20 via fingerprint/touch sensing routing wires FRW, respectively.

The touch IC 20 may activate the touch sensing mode according to a touch enable signal input from the host system 18, and activate the fingerprint sensing mode according to a fingerprint enable signal.

Figure 6:
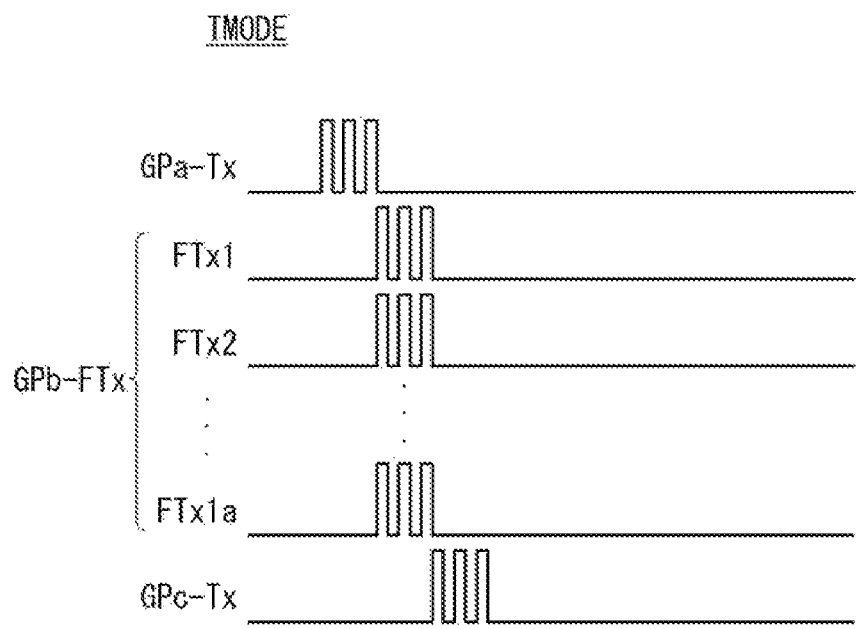
FIG. 6 are waveform diagrams illustrating sensor driving signals (i.e., touch sensor driving signals) applied to the fingerprint sensor integrated type touch screen panel in a touch sensing mode.

In a touch sensing mode TMODE, the driving signal supply unit DSU of the touch IC 20 supplies touch drive signals having the same phase to the touch driving electrodes Tx of the touch driving electrode group GPa-Tx through the touch routing wires TW1 as shown in FIG. 6. And then the driving signal supply unit DSU supplies the touch drive signals having the same phase to the fingerprint/touch driving electrodes FTx of the fingerprint/touch driving electrode group GPb-FTx through the plurality of fingerprint/touch driving routing wires FTW. Also, the driving signal supply unit DSU supplies touch drive signal having a same phase to the touch driving electrodes Tx of the touch driving electrode group GPc-Tx through the touch routing wires TW2.

As described above, the driving signal supply unit DSU of the touch IC 20 sequentially drives the touch driving electrode group GPa-Tx, the fingerprint/touch driving electrode group GPb-FTx, and the touch driving electrode group GPc-Tx in a group unit as shown in FIG. 6 and then the touch sensing unit TSU of the touch IC 20 senses the touch sensing electrode group GPa-Rx and GPc-Rx, and the fingerprint/touch sensing electrode group GPb-FRx in a group unit to be synchronized to the touch driving manner.

In a fingerprint sensing mode FMODE, the touch IC 20 sequentially drives the touch driving electrode group GPa-Tx, the fingerprint/touch driving electrode group GPb-FTx, and the touch driving electrode group GPc-Tx. At this time, the driving signals in which phases are sequentially delayed are applied to the fingerprint/touch driving electrodes FTx1 to FTxa of the fingerprint/touch driving electrode group GPb-FTx so that the fingerprint/touch driving electrodes FTx1 to FTxa are sequentially driven one line at a time. And then, only some of the fingerprint/touch sensing electrodes FRx1 to FRxa arranged in the fingerprint/touch area FTA are sensed.

Hereinafter, the touch sensing and the fingerprint sensing of the fingerprint sensor integrated type display device according to the aspect of the present disclosure will be described more specifically with reference to FIGS. 8 and 9.

Figure 8:
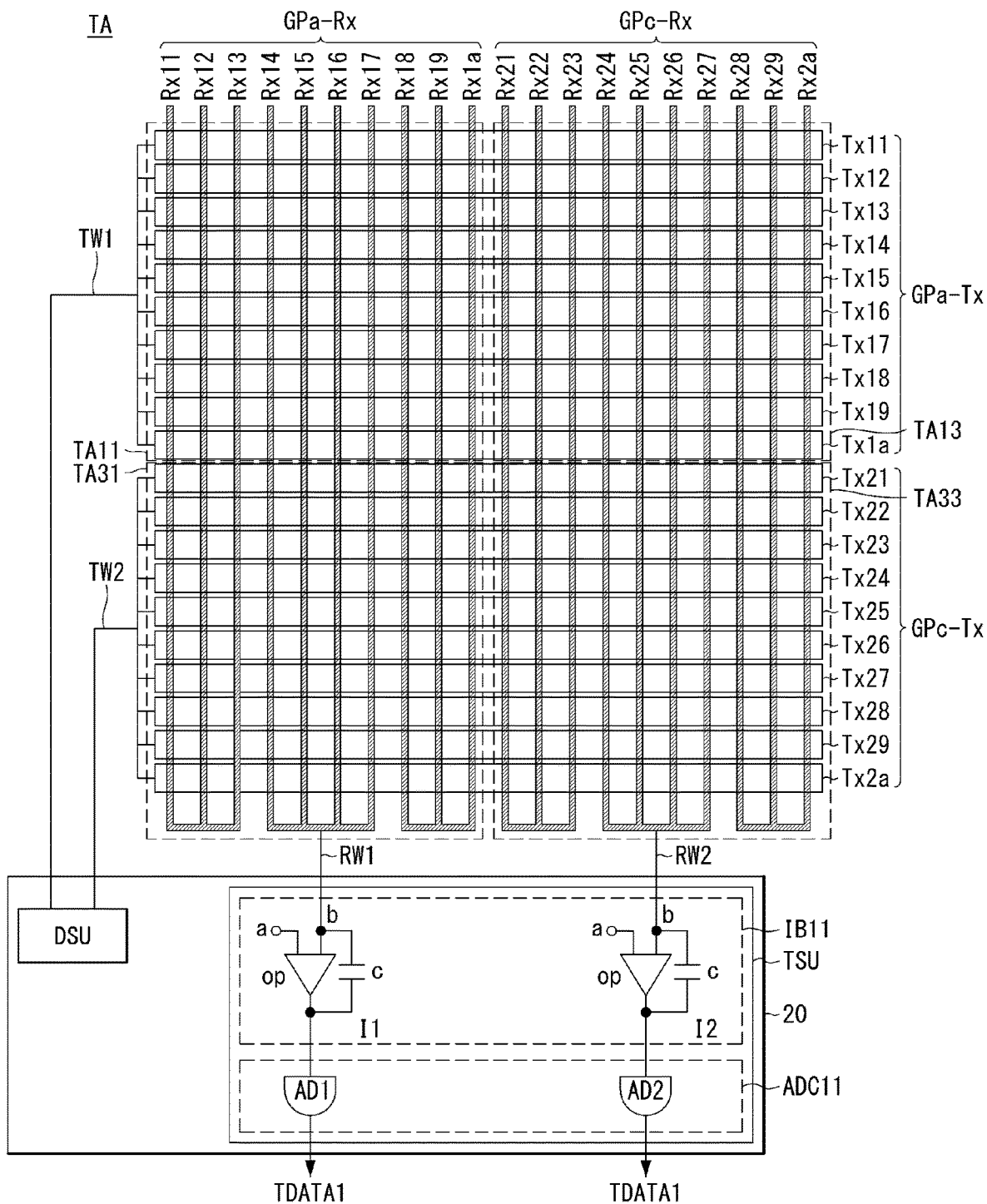
FIG. 8 is a view showing touch electrodes and a touch IC disposed in a touch area of the fingerprint sensor integrated type touch screen panel shown in FIG. 5.

FIG. 8 is a view showing touch electrodes and a touch IC disposed in a touch area of the fingerprint sensor integrated type touch screen panel shown in FIG. 5. FIG. 9 is a view showing touch electrodes and a touch IC disposed in a fingerprint/touch area of the fingerprint sensor integrated type touch screen panel shown in FIG. 5.

Referring to FIG. 8, the touch area TA of the fingerprint sensor integrated touch screen panel TSP of the present disclosure includes a 1-1 touch area TA11, a 1-2 touch area TA13, 2-1 touch area TA31, and a 2-2 touch area TA33.

There are a plurality of first touch driving electrodes Tx11 to Tx1a in the 1-1 touch area TAU and the 1-2 touch area TA13 arranged in a first row. The plurality of first touch driving electrodes Tx11 to Tx1a are parallel with each other in a first direction (e.g., y-axis direction). There are a plurality of second touch driving electrodes Tx21 to Tx2a in the 2-1 touch area TA31 and the 2-2 touch area TA33 arranged in a second row. The plurality of second touch driving electrodes Tx21 to Tx2a are parallel with each other in the first direction.

There are a plurality of first touch sensing electrodes Rx11 to Rx1a in the 1-1 touch area TA11 and the 2-1 touch area TA31 arranged in a first column. The plurality of first touch sensing electrodes Rx11 to Rx1a are parallel with each other in a second direction (e.g., x-axis direction) crossing the first direction. There are a plurality of second touch sensing electrodes Rx21 to Rx2a in the 1-2 touch area TA13 and the 2-2 touch area TA33 arranged in a second column. The plurality of second touch sensing electrodes Rx21 to Rx2a are parallel with each other in the second direction.

The plurality of first touch driving electrodes Tx11 to Tx1a are grouped into a first touch driving electrode group GPa-Tx, and connected to a driving signal supply unit DSU of the of the touch IC 20 through a first touch driving routing wire TW1. The plurality of second touch driving electrodes Tx21 to Tx2a are grouped into a second touch driving electrode group GPc-Tx, and connected to the driving signal supply unit DSU of the of the touch IC 20 through a second touch driving routing wire TW2.

Also, the plurality of first touchسensing electrodes Rx11 to Rx1a are grouped into the first touch sensing electrode group GPa-Rx, and connected to a touch sensing unit TSU of the of the touch IC 20 through a first touch sensing routing wire RW1. The plurality of second touch sensing electrodes Rx21 to Rx2a are grouped into the second touch sensing electrode group GPc-Rx, and connected to the touch sensing unit TSU of the of the touch IC 20 through a second touch sensing routing wire RW2.

The touch sensing unit TSU of the touch IC 20 includes a first touch integration block IB11 and a first touch analog/digital converter ADC11.

The first touch integration block IB11 includes a first integrator I1 connected to the first touch sensing electrode group GPa-Rx through the first touch sensing routing wire RW1, and a second integrator 12 connected to the second touch sensing electrode group GPc-Rx through the second touch sensing routing wire RW2.

Each of the first and second integrators I1 and I2 includes an operational amplifier OP and a capacitor C. The operational amplifier OP has a first and second input terminals a and b, and an output terminal. The capacitor C is connected in parallel with the operational amplifier OP between the output terminal and one input terminal b of the operational amplifier OP. A reference voltage source is connected to the first input terminal a of the operational amplifier OP, and the touch sensing routing wire RW1 or RW2 is connected to the second input terminal b of the operational amplifier OP.

The first touch analog-to-digital converter ADC11 includes a first analog-to-digital converter AD1 and a second analog-to-digital converter (AD2). The first analog-to-digital converter AD1 converts an analog data of an integral value of a touch sensing data output through the first integrator I1 into a digital data and output the digital data. The second analog-to-digital converter AD2 converts an analog data of an integrated value of the touch sensing data output through the second integrator I2 into a digital data and outputting the digital data.

A digital touch sensing data TDATA output from the first and second analog-to-digital converters AD1 and AD2 is supplied to the host system 18. The host system 18 recognizes a touch position by executing an application program associated with the digital touch sensing data TDATA input to the host system 18.

In the touch sensing mode TMODE, the driving signal supply unit DSU of the touch IC 20 supplies touch driving signals to the first and second touch driving electrode groups GPa-Tx and GPc-Tx through the first and second touch routing wires TW1 and TW2, respectively. The touch driving signals supplied to the first touch driving electrode group GPa-Tx, the fingerprint/touch electrode group GPb-FTx, and the second touch driving electrode group GPc-Tx are signals in which phases are sequentially delayed.

The touch sensing unit TSU of the touch IC 20 outputs the touch sensing data TDATA1 and TDATA2 obtained by sensing the first touch sensing electrode group GPa-Rx and the second touch sensing electrode group GPc-Rx in synchronization with the touch driving signal, to the host system 18.

For example, the first integrator I1 of the first touch integration block IB11 integrates a first touch sensing voltage generated by mutual capacitance between the first and second touch driving electrode groups GPa-Tx and GPc-Tx and the first touch sensing electrode group GPa-Rx sensed through the first touch sensing routing wire RW1, and outputs the integrated first touch sensing voltage. The second integrator I2 of the first touch integration block IB11 integrates a second touch sensing voltage generated by mutual capacitance between the first and second touch driving electrode groups GPa-Tx and GPc-Tx and the second touch sensing electrode group GPc-Rx sensed through the second touch sensing routing wire RW2, and outputs the integrated second touch sensing voltage.

The first analog/digital converter AD1 converts the integrated first analog touch sensing data into a first digital touch sensing data TDATA1 and output the first digital touch sensing data TDATA1 to the host system 18. Also, the second analog/digital converter AD2 converts the integrated second analog touch sensing data into a second digital touch sensing data TDATA2 and output the second digital touch sensing data TDATA2 to the host system 18.

In the fingerprint sensing mode FMODE, the touch IC 20 sequentially drives the touch driving electrode group GPa-Tx, the fingerprint/touch driving electrode group GPb-FTx and the touch driving electrode group GPc-Tx. To the fingerprint/touch driving electrodes FTx1 to FTxa of the fingerprint/touch driving electrode group GPb-FTx, driving signals in which phases are sequentially delayed are supplied.

The touch sensing unit TSU of the touch IC 20 supplies the digital touch sensing data TDATA1 and TDATA2 to the host system 18. The digital touch sensing data TDATA1 and TDATA2 are obtained by sensing the first touch sensing electrode group GPa-Rx and the second touch sensing electrode group GPc-Rx in synchronization with the touch driving signal.

The host system 18 recognizes the touch position by executing an application program associated with the digital touch sensing data TDATA1 and TDATA2 input from the touch IC 20.

Figure 9:
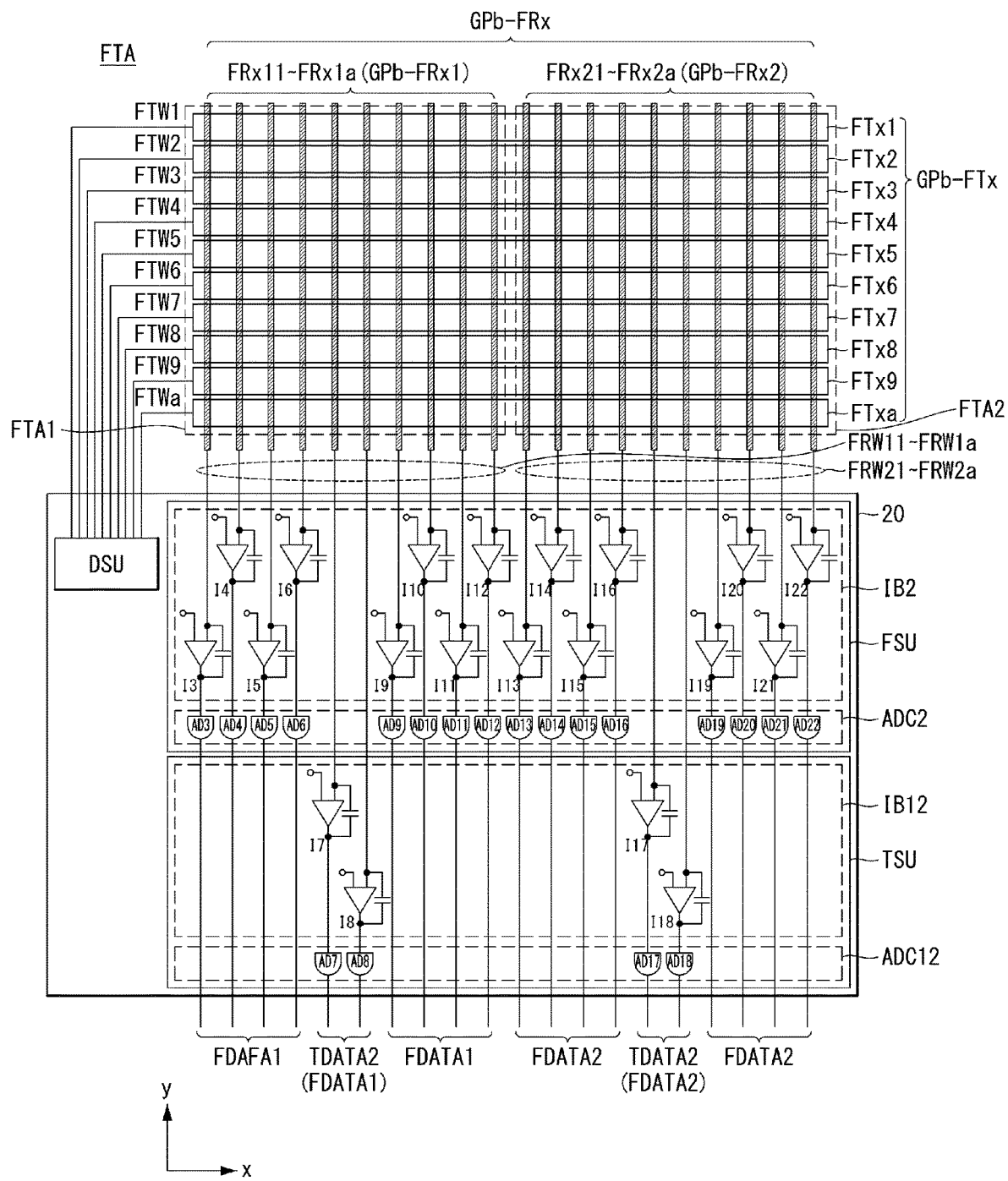
FIG. 9 is a view showing touch electrodes and a touch IC disposed in a fingerprint/touch area of the fingerprint sensor integrated type touch screen panel shown in FIG. 5.

Referring to FIG. 9, the fingerprint/touch area FTA of the fingerprint sensor integrated touch screen panel TSP of the present disclosure includes a first fingerprint/touch area FTA1 and a second fingerprint/touch area FTA2. A fingerprint/touch driving electrode group GPb-FTx disposed in the fingerprint/touch areas FTA1 and FTA2 is connected to the touch IC 20 via the fingerprint/touch driving routing wires FTW1 to FTWa. A fingerprint/touch sensing electrode group GPb-FRx disposed in the fingerprint/touch areas FTA1 and FTA2 is connected to the touch IC 20 via the fingerprint/touch sensing routing wires FRW11 to FRW1a, and connected to the touch IC 20 via the fingerprint/touch sensing routing wires FRW11 to FRW1a and FRW21 to FRW2a.

In FIG. 9, the fingerprint/touch area FTA has two fingerprint/touch areas FTA1 and FTA2 including the first fingerprint/touch area FTA1 and the second fingerprint/touch area FTA2. However, this is merely for convenience of explanation, and it should be understood that the case of having one or more than three fingerprint/touch areas is also included in the disclosure.

There are a plurality of fingerprint/touch driving electrodes FTx1 to FTxa arranged in the first direction (e.g., y-axis direction) in the first and second fingerprint/touch areas FTA1 and FTA2. Also, there is a first fingerprint/touch sensing electrode group GPb-FRx1 including a plurality of first fingerprint/touch sensing electrodes FRx11 to FRx1a arranged in a second direction (e.g., x-axis direction) crossing the first direction in the first fingerprint/touch areas FTA1. There is a second fingerprint/touch sensing electrode group GPb-FRx2 including a plurality of second fingerprint/touch sensing electrodes FRx21 to FRx2a arranged in a second direction crossing the first direction in the second fingerprint/touch areas FTA2.

The plurality of fingerprint/touch driving electrodes FTx1 to FTxa are connected to the touch IC 20 via the plurality of fingerprint/touch driving routing wires FTW1 to FTWa, respectively. The plurality of first fingerprint/touch sensing electrodes FRx11 to FRx1a are respectively connected to the touch IC 20 through a plurality of first fingerprint/touch sensing routing wires FRW11 to FRW1a. The plurality of second fingerprint/touch sensing electrodes FRx21 to FRx2a are respectively connected to the touch IC 20 through a plurality of second fingerprint/touch sensing routing wires FRW21 to FRW2a.

The touch IC 20 further includes a touch fingerprint sensing unit FSU having a fingerprint integration block IB2 and a fingerprint analog/digital converter ADC2.

The fingerprint integration block IB2 includes a third to sixth integrators I3 to I6 connected to the first fingerprint/touch sensing electrodes FRx11 to FRx14 through the first fingerprint/touch sensing routing wires FRW11 to FRW14, a ninth to twelfth integrators I9 to I12 connected to the to the first fingerprint/touch sensing electrodes FRx17 to FRx1a via the first fingerprint/touch sensing routing wires FRW17 to FRW1a, and a thirteenth to sixteenth integrators I13 to I16 and a nineteenth to twenty-second integrators I19 to I22 connected to the second fingerprint/touch sensing electrodes FRx21 to FRx24 and FRx27 to FRx2a, respectively.

The fingerprint analog/digital converter ADC2 includes a third to a sixth analog-to-digital converters AD3 to AD6 respectively connected to the third to sixth integrators I3 to I6, a ninth to twelfth analog-to-digital converters AD9 to AD12 respectively connected to the ninth to twelfth integrators I9 to I12, a thirteenth to sixteenth analog-to-digital converters AD13 to AD16 respectively connected to the thirteenth to sixteenth integrators I13 to I16, and a nineteenth to twenty-second analog-to-digital converters AD19 to AD22 respectively connected to the nineteenth to twenty-second integrators I19 to I22.

The touch sensing unit TSU of the touch IC 20 further includes a second touch integration block IB12 and a second touch analog/digital converter ADC12.

The second touch integration block IB12 includes seventh and eighth integrators I7 and I8 connected to the first fingerprint/touch sensing electrodes FRx15 and FRx16 via the first fingerprint/touch sensing routing wires FRW15 and FRW16, and seventeenth and eighteenth integrators I17 and I18 connected to the second fingerprint/touch sensing electrodes FRx25 and FRx26 via the second fingerprint/touch sensing routing wires FRW25 and FRW26.

The fingerprint/touch sensing electrodes (for example, FRx15 and FRx16) connected to the second touch integration block IB12 may be located at the center of each fingerprint/touch area FTA. This is because the touch recognition rate of the fingerprint/touch area FTA can be enhanced as compared with the case where the fingerprint/touch sensing electrode is disposed on either side if the fingerprint/touch sensing electrode connected to the second touch integration block IB12 is disposed at the center of the fingerprint/touch area.

The number of fingerprint/touch sensing electrodes connected to the second touch integration block IB12 may be about 5% to 50% of the total number of fingerprint/touch sensing electrodes arranged in each fingerprint/touch area. This is because if the total number of fingerprint/touch sensing electrodes is less than 5%, the touch recognition rate decreases, and if the number of fingerprint/touch sensing electrodes exceeds 50%, the number of channels of the touch sensing unit TSU increases and the size of the touch IC 20 increases.

The second touch analog-to-digital converter ADC12 includes seventh and eighth analog-to-digital converters AD7 and AD8 respectively connected to the seventh and eighth integrators 17 and 18, and seventeenth and eighteenth analog-to-digital converters AD17 and AD18 respectively connected to the seventeenth and eighteenth integrators 117 and 118.

In the touch sensing mode TMODE, the driving signal supply unit DSU of the touch IC 20 supplies touch driving signals having the same phase to the fingerprint/touch driving electrode group GPb-Tx through the fingerprint/touch driving routing wires FTW1 to FTWa.

The touch sensing unit TSU of the touch IC 20 may obtain touch sensing data of the first and second fingerprint/touch areas FTA1 and FTA2 by using the seventh and eighth integrators 17 and 18 and the seventeenth and eighteenth integrators 117 and 118 included in the second touch integration block IB12 in synchronization with the touch drive signal. The seventh and eighth analog-to-digital converters AD7 and AD8 and the seventeenth and eighteenth analog-to-digital converters AD17 and AD18 convert the analog touch sensing data from the seventh and eighth integrators 17 and 18 and the seventeenth and eighteenth integrators 117 and 118 into a second digital touch sensing data TDATA2, and then output it.

Figure 7:
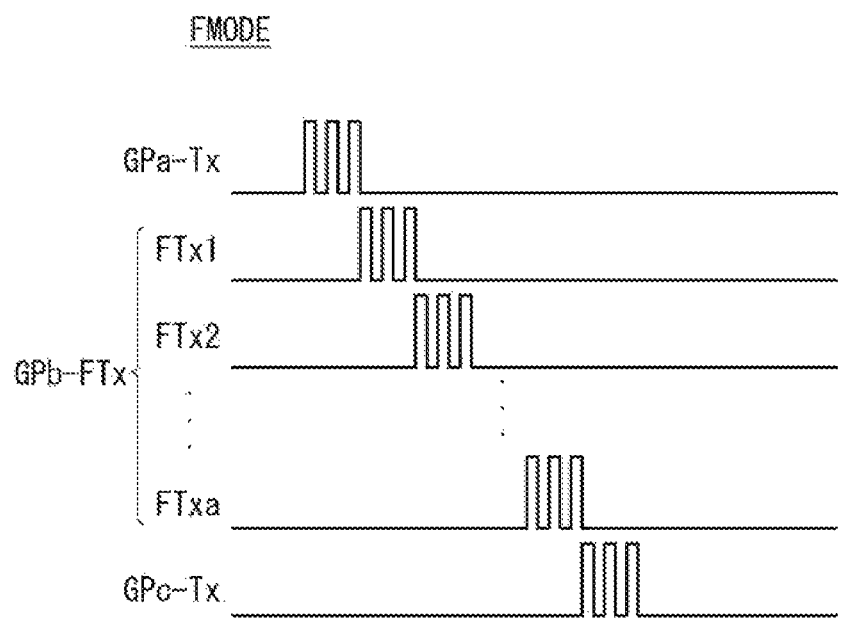
FIG. 7 are waveform diagrams illustrating sensor driving signals (i.e., fingerprint sensor driving signals) applied to the fingerprint sensor integrated type touch screen panel in a fingerprint sensing mode.

In the fingerprint sensing mode FMODE, the driving signal supply unit DSU of the touch IC 20 supplies fingerprint driving signals of which phases are sequentially delayed to the fingerprint/touch driving electrodes FTx1 to FTxa belonging to the fingerprint/touch driving electrode group GPb-Tx through the fingerprint/touch driving routing wires FTW1 to FTWa as shown in FIG. 7. A fingerprint drive signal whose phase is sequentially delayed is supplied to each of the fingerprint/touch driving electrodes FTx1 to FTxa.

The fingerprint sensing unit FSU of the touch IC 20 may obtain fingerprint sensing data of the first and second fingerprint/touch areas FTA1 and FTA2 by using the third to sixth integrators 13 to 16, the ninth to sixteenth integrators 19 to 116, and the nineteenth to twenty-second integrators 19 to 22 included in the fingerprint integration block IB2, and the seventh and eighth integrators 17 and 18, and the seventeenth and eighteenth integrators 117 and 118 included in the second touch integration block IB12 in synchronization with the fingerprint drive signal.

The third to twenty-second analog-to-digital converters AD3 to AD22 of the touch IC 20 convert the analog fingerprint sensing data supplied from the third to twenty-second integrators 13 to 122 into digital fingerprint sensing data FDATA1 and FDATA2 and outputs the converted data.

According to the above-described fingerprint sensor integrated type touch screen panel according to the aspects of the present disclosure, it is possible to obtain a touch screen panel having a narrow bezel area since the touch screen panel does not require a separate fingerprint sensor area in the bezel area.

In addition, since the fingerprint/touch electrodes are disposed in the fingerprint/touch area of the active area, it is possible to implement fingerprint recognition function as well as touch recognition function, thereby effectively eliminating a dead zone in the active area of the touch screen panel.

In addition, since the touch electrode is formed in a large pattern and the fingerprint/touch electrode is formed in a fine pattern, it is possible to prevent deterioration of touch performance generated when the touch electrode is formed in a fine pattern.

Furthermore, since only some of the fingerprint/touch sensing electrodes disposed in the fingerprint/touch area can be used as the touch sensing electrode in the touch sensing mode, it is possible to simultaneously perform touch sensing and fingerprint sensing while reducing the number of channels.

It will be apparent to those skilled in the art that various modifications and variations can be made in the present disclosure without departing from the spirit or scope of the present disclosure. For example, the number of touch electrodes, fingerprint/touch electrodes, integrators, analog-to-digital converters, and various wires described in the aspects of the present disclosure are only illustrative examples, it should be understood that this is not intended to affect scope of the disclosure. Thus, it is intended that the disclosure covers the modifications and variations of this disclosure provided they come within the scope of the appended claims and their equivalents.

What is claimed is:

1. A fingerprint sensor integrated type touch screen panel having at least one fingerprint/touch area and a plurality of touch areas, the touch screen panel comprising:
   a fingerprint/touch driving electrode group including a plurality of fingerprint/touch driving electrodes in parallel with each other in a first direction and passing through the at least one fingerprint/touch area;
   a fingerprint/touch sensing electrode group including a plurality of fingerprint/touch sensing electrodes in parallel with each other in a second direction crossing the first direction and passing through the at least one fingerprint/touch area;
   a touch driving electrode group including a plurality of touch driving electrodes in parallel with each other in the first direction and passing through touch areas disposed in the first direction;
   a touch sensing electrode group including a plurality of touch sensing electrodes in parallel with each other in the second direction and passing through touch areas disposed in the second direction; and
   a touch IC configured to supply touch driving signals to the touch driving electrode group and the fingerprint/touch driving electrode group and obtain touch sensing data by sensing the touch sensing electrode group and a first part of the plurality of fingerprint/touch sensing electrodes in a touch sensing mode, and supply fingerprint driving signals to the fingerprint/touch driving electrodes and obtain fingerprint sensing data by sensing the plurality of fingerprint/touch sensing electrodes in a fingerprint sensing mode,
   wherein a distance between adjacent electrodes of the plurality of fingerprint/touch driving electrodes disposed at the at least one fingerprint/touch area is substantially the same as a distance between adjacent touch driving electrodes disposed at the plurality of touch areas, wherein the plurality of touch driving electrodes and the plurality of touch sensing electrodes are connected to the touch IC respectively through a single touch driving routing wire and a single touch sensing routing wire, wherein the plurality of fingerprint/touch driving electrodes and the plurality of fingerprint/touch sensing electrodes are connected to the touch IC respectively through a plurality of fingerprint/touch driving routing wires and a plurality of fingerprint/touch sensing routing wires, wherein the touch IC comprises:
  a touch sensing unit configured to obtain the touch sensing data of the plurality of touch areas and the at least one fingerprint/touch area by sensing the touch sensing electrode group and the first part of the plurality of fingerprint/touch sensing electrodes without sensing a second part of the plurality of fingerprint/touch sensing electrodes in the touch sensing mode; and
  a fingerprint sensing unit configured to obtain the fingerprint sensing data of the at least one fingerprint/touch area by sensing the first and second parts of the plurality of fingerprint/touch sensing electrodes in the fingerprint sensing mode, and
wherein a first part of the plurality of fingerprint/touch sensing routing wires is connected to the touch sensing unit of the touch IC and a second part of the plurality of fingerprint/touch sensing routing wires is connected to the fingerprint sensing unit of the touch IC.

2. The fingerprint sensor integrated type touch screen panel of claim 1, wherein the part of the plurality of fingerprint/touch sensing electrodes is disposed at a center portion of the fingerprint/touch area.

3. The fingerprint sensor integrated type touch screen panel of claim 1, wherein the part of the plurality of fingerprint/touch sensing electrodes includes 5% to 50% of a total number of the fingerprint/touch sensing electrodes disposed in the fingerprint/touch area.

4. The fingerprint sensor integrated type touch screen panel of claim 1, wherein the touch IC comprises:
  a driving signal supply unit configured to supply the touch driving signals having phases being sequentially delayed to the touch driving electrode group and the fingerprint/touch driving electrode group in the touch sensing mode, and supply the fingerprint driving signals having phases being sequentially delayed to the fingerprint/touch driving electrodes in the fingerprint sensing mode.

5. The fingerprint sensor integrated type touch screen panel of claim 1, wherein the touch sensing unit comprises;
  a first touch integration block configured to sense the touch sensing electrode group via the single touch sensing routing wire and integrate analog touch sensing data sensed through the single touch sensing routing wire; and
  a first touch analog/digital converter configured to convert the analog touch sensing data output from the first touch integration block into digital touch sensing data.

6. The fingerprint sensor integrated type touch screen panel of claim 5, wherein the fingerprint sensing unit comprises:
  a fingerprint integration block configured to sense the plurality of fingerprint/touch electrodes via the plurality of fingerprint/touch sensing routing wires and integrate analog fingerprint sensing data sensed through the plurality of fingerprint/touch sensing routing wires; and
  a fingerprint analog/digital converter configured to convert the analog fingerprint sensing data output from the fingerprint integration block into digital fingerprint sensing data.

7. A fingerprint sensor integrated type touch screen panel having at least one fingerprint/touch area and a plurality of touch areas having at least first to fourth sections, the touch screen panel comprising:
  a plurality of fingerprint/touch sensing electrodes and a plurality of fingerprint/touch driving electrodes disposed in the at least one fingerprint/touch area;
  a first group of touch driving electrodes, each first group touch driving electrode in parallel with each other along a first direction and disposed in the first and second sections;
  a second group of touch driving electrodes, each second group touch driving electrode in parallel with each other in the first direction and disposed in the third and fourth sections;
  a first group of touch sensing electrodes, each first group touch sensing electrode in parallel with each other along a second direction and disposed in the first and second sections;
  a second group of touch sensing electrodes, each second group touch sensing electrode in parallel with each other along the second direction and disposed in the third and fourth sections;
  a driving signal supply unit connected to the first and second groups of touch driving electrodes respectively through a single touch driving routing wire and a single touch driving routing wire; and
  a touch sensing unit connected to the first and second groups of touch sensing electrodes respectively through a single touch sensing routing wire and a single touch sensing routing wire,
wherein the first and second groups of touch sensing electrodes and a first part of the plurality of fingerprint/touch sensing electrodes are used for a touch sensing function in a touch sensing mode,
wherein a distance between adjacent electrodes of the plurality of fingerprint/touch driving electrodes disposed at the at least one fingerprint/touch area is substantially the same as a distance between adjacent touch driving electrodes disposed at the plurality of touch areas,
wherein the plurality of fingerprint/touch driving electrodes is connected to the driving signal supply unit respectively through a plurality of fingerprint/touch driving routing wires, and the plurality of fingerprint/touch sensing electrodes is connected to the touch sensing unit respectively through a plurality of fingerprint/touch sensing routing wires,
wherein the touch IC comprises:
  a touch sensing unit configured to obtain the touch sensing data of the plurality of touch areas and the at least one fingerprint/touch area by sensing the touch sensing electrode group and the first part of the plurality of fingerprint/touch sensing electrodes without sensing the second part of the plurality of fingerprint/touch sensing electrodes in the touch sensing mode; and
  a fingerprint sensing unit configured to obtain the fingerprint sensing data of the at least one fingerprint/touch area by sensing the first and second parts of the plurality of fingerprint/touch sensing electrodes in the fingerprint sensing mode, and
wherein a first part of the plurality of fingerprint/touch sensing routing wires is connected to the touch sensing unit of the touch IC and a second part of the plurality of fingerprint/touch sensing routing wires is connected to the fingerprint sensing unit of the touch IC.

8. The fingerprint sensor integrated type touch screen panel of claim 7, wherein the part of the plurality of fingerprint/touch sensing electrodes is disposed at a center portion of the fingerprint/touch area.

9. The fingerprint sensor integrated type touch screen panel of claim 7, wherein the part of the plurality of fingerprint/touch sensing electrodes includes 5% to 50% of a total number of the fingerprint/touch sensing electrodes disposed in the fingerprint/touch area.

10. The fingerprint sensor integrated type touch screen panel of claim 7, wherein the driving signal supply unit supplies the touch driving signals with sequentially delayed phases to the first and second groups of touch driving electrodes and the fingerprint/touch driving electrode group in the touch sensing mode, and supplies fingerprint driving signals with sequentially delayed phases to the plurality of fingerprint/touch driving electrodes in a fingerprint sensing mode.

11. The fingerprint sensor integrated type touch screen panel of claim 7, wherein the touch sensing unit comprises;
   a first touch integration block configured to sense the first and second groups of touch sensing electrodes and integrate analog touch sensing data; and
   a first touch analog/digital converter configured to convert the analog touch sensing data output from the first touch integration block into digital touch sensing data.

12. The fingerprint sensor integrated type touch screen panel of claim 7, wherein the fingerprint sensing unit comprises:
   a fingerprint integration block configured to sense the plurality of fingerprint/touch electrodes via the plurality of fingerprint/touch sensing routing wires and integrate analog fingerprint sensing data sensed through the plurality of fingerprint/touch sensing routing wires; and
   a fingerprint analog/digital converter configured to convert the analog fingerprint sensing data output from the fingerprint integration block into digital fingerprint sensing data.

13. The fingerprint sensor integrated type touch screen panel of claim 11, wherein the touch sensing unit further comprises:
   a second touch integration block configured to sense the part of the plurality of fingerprint/touch sensing electrodes via the plurality of fingerprint/touch sensing routing wires and integrate analog sensing data sensed through the plurality of fingerprint/touch sensing routing wires; and
   a second touch analog/digital converter configured to convert the analog sensing data output from the second touch integration block into digital sensing data.

14. A fingerprint sensor integrated type fingerprint sensor integrated type touch screen panel having at least first and second fingerprint/touch areas and a plurality of touch areas, the touch screen panel comprising:
   a plurality of touch driving electrodes and a plurality of touch sensing electrodes disposed in the a plurality of touch areas;
   a plurality of fingerprint/touch driving electrodes arranged along a first direction disposed in the first and second fingerprint/touch areas;
   a first fingerprint/touch sensing electrode group including a plurality of first fingerprint/touch sensing electrodes arranged along a second direction in the first fingerprint/touch area;
   a second fingerprint/touch sensing electrode group including a plurality of second fingerprint/touch sensing electrodes arranged along the second direction in the second fingerprint/touch area;
   a driving signal supply unit connected to the plurality of fingerprint/touch driving electrodes through a plurality of fingerprint/touch driving routing wires; and
   a touch sensing unit connected to the first and second fingerprint/touch sensing electrode groups through a plurality of fingerprint/touch sensing routing wires,
   wherein the plurality of touch sensing electrodes and a part of the first and second fingerprint/touch sensing electrode groups are used for a touch sensing function in a touch sensing mode,
   wherein a distance between adjacent electrodes of the plurality of fingerprint/touch driving electrodes disposed at the at least one fingerprint/touch area is substantially the same as a distance between adjacent touch driving electrodes disposed at the plurality of touch areas,
   wherein the plurality of touch driving electrodes is connected to the driving signal supply unit through a single touch driving routing wire and the plurality of touch sensing electrodes is connected to the touch sensing unit through a single touch sensing routing wire,
   wherein the touch IC comprises:
   a touch sensing unit configured to obtain the touch sensing data of the plurality of touch areas and the at least one fingerprint/touch area by sensing the touch sensing electrode group and the first part of the plurality of first and second fingerprint/touch sensing electrodes without sensing a second part of the plurality of first and second fingerprint/touch sensing electrodes in the touch sensing mode; and
   a fingerprint sensing unit configured to obtain the fingerprint sensing data of the at least one fingerprint/touch area by sensing the first and second parts of plurality of first and second fingerprint/touch sensing electrodes in the fingerprint sensing mode, and
   wherein a first part of the plurality of first and second fingerprint/touch sensing routing wires is connected to the touch sensing unit of the touch IC and a second part of the plurality of first and second fingerprint/touch sensing routing wires is connected to the fingerprint sensing unit of the touch IC.

15. The fingerprint sensor integrated type touch screen panel of claim 14, wherein the part of the first and second fingerprint/touch sensing electrode groups is disposed at a center portion of the first and second fingerprint/touch areas.

16. The fingerprint sensor integrated type touch screen panel of claim 14, wherein the part of the first and second of fingerprint/touch sensing electrode groups includes 5% to 50% of a total number of the first and second fingerprint/touch sensing electrode groups disposed in the first and second fingerprint/touch areas.

17. The fingerprint sensor integrated type touch screen panel of claim 14, wherein the driving signal supply unit supplies the touch driving signals with sequentially delayed phases to the plurality of touch driving electrodes and the first and second fingerprint/touch driving electrode groups in the touch sensing mode, and supplies fingerprint driving signals with sequentially delayed phases to the first and second fingerprint/touch driving electrode groups in a fingerprint sensing mode.

18. The fingerprint sensor integrated type touch screen panel of claim 14, wherein the touch sensing unit comprises;

a first touch integration block configured to sense the plurality of touch sensing electrodes and integrate analog touch sensing data; and a first touch analog/digital converter configured to convert the analog touch sensing data output from the first touch integration block into digital touch sensing data.

19. The fingerprint sensor integrated type touch screen panel of claim 14, wherein the fingerprint sensing unit comprises:

a fingerprint integration block configured to sense the first and second fingerprint/touch electrode groups via the plurality of fingerprint/touch sensing routing wires and integrate analog fingerprint sensing data sensed through the plurality of fingerprint/touch sensing routing wires; and a fingerprint analog/digital converter configured to convert the analog fingerprint sensing data output from the fingerprint integration block into digital fingerprint sensing data.

20. The fingerprint sensor integrated type touch screen panel of claim 18, wherein the touch sensing unit further comprises:

a second touch integration block configured to sense the part of the first and second fingerprint/touch sensing electrode groups via the plurality of fingerprint/touch sensing routing wires and integrate analog sensing data sensed through the plurality of fingerprint/touch sensing routing wires; and a second touch analog/digital converter configured to convert the analog sensing data output from the second touch integration block into digital sensing data.

* * * * *